Sept. 11, 1934.    C. J. GARDEEN    1,972,987
REVERSIBLE MOTOR
Filed March 20, 1933    2 Sheets-Sheet 1

INVENTOR
CARL J. GARDEEN
BY
ATTORNEY.

Sept. 11, 1934.  C. J. GARDEEN  1,972,987
REVERSIBLE MOTOR
Filed March 20, 1933    2 Sheets-Sheet 2

INVENTOR
CARL J. GARDEEN
BY
ATTORNEY

Patented Sept. 11, 1934

1,972,987

UNITED STATES PATENT OFFICE 1,972,987

REVERSIBLE MOTOR

Carl J. Gardeen, St. Paul, Minn., assignor to Consolidated Electric Company, St. Paul, Minn., a corporation of Minnesota Application March 20, 1933, Serial No. 661,706

11 Claims. (Cl. 172—278)

This invention relates to an electric motor of the type operating on alternating current, and one which can be reversed, stopped, or the speed varied without interrupting an electric circuit. While a motor of the invention is capable of many uses and applications, it has been particularly used in connection with regulators of various kinds such as a regulator for a pressure water system.

It is an object of this invention, therefore, to provide a motor operating on alternating current and which can be reversed and the speed varied without interrupting or varying the applied voltage.

It is another object of the invention to provide a reversible motor as set forth in the above paragraph, which will require a minimum amount of energy to actuate the reversing and controlling mechanism.

It is a further object of the invention to provide a motor which may be used to operate devices requiring considerable energy for their operation, the motor being controlled to effect such operation by very slight mechanical movements, which movements require a small amount of energy.

It is still another object of the invention to provide a motor comprising core pieces arranged in juxtaposition, one of which has a plurality of portions, a movable member between said core pieces, an exciting current for one of said core pieces, a closed circuit associated with the other core piece having a device in series therein having reactance substantially of the same value as the remainder of said circuit and of opposite sign, said core pieces being arranged so as to be disposed in a symmetrical position, and being arranged for relative movement to one side or the other of said symmetrical position, whereby a magnetic flux is set up in the core piece having the closed circuit thereon, the current thus being induced in said closed circuit whereby a shifting magnetic field is produced to move said movable member.

It is still another object of the invention to provide a motor having oppositely arranged cores, an exciting circuit on one of said cores, a closed circuit on the other of said cores, said closed circuit having a capacity device such as a condenser therein, the reactance of which is preferably equal in value to and of opposite sign to the reactance of the remainder of said closed circuit, said cores being capable of being arranged in a neutral or a symmetrical position, where the flux in each is in phase, a movable member between said cores, and means for causing a flow of flux in said core having a closed circuit thereon, which flow of flux is out of phase with the flow of flux in the other core, whereby a shifting magnetic field is set up for moving said movable member.

These and other objects and advantages of the invention will be fully set forth in the following description made in connection with the accompanying drawings, in which like reference characters refer to similar parts throughout the several views, and in which:—

Figure 1:
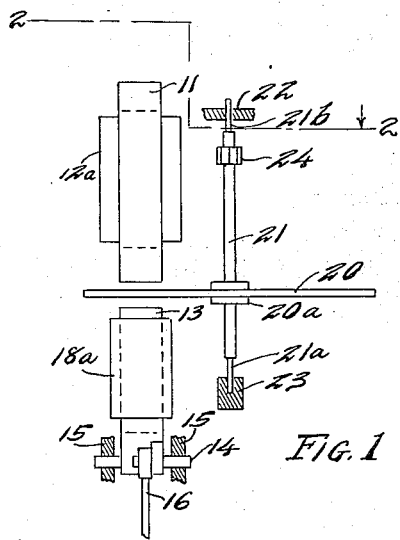
Fig. 1 is a somewhat diagrammatic view mainly in side elevation, showing the construction of motor, certain parts being shown in section.

It will be understood, as stated in connection with Fig. 1, that all of the views are more or less diagrammatic.

Referring to the drawings, in Figs. 1 to 5 a structure of motor is shown comprising a core 11, and while this might be variously made, in the embodiment of the invention illustrated it is shown as having a central post or arm 11a, and side arms or posts 11b and 11c, said arms 11b and 11c being connected at their upper ends by horizontal portions to the top of the post or arm 11a. The arms 11b and 11c also have horizontal portions at their lower ends extending at right angles toward post 11a, illustrated as having vertical faces spaced a short distance from the vertical sides of the post or arm 11a. An electric conductor 12 is wound about central post 11a, forming a coil 12a, and will form part of a circuit extending to a source of alternating current. Another core 13 is shown, and while this might be variously formed, in the embodiment of the invention illustrated it is shown as having a lower portion from which extend upwardly spaced arms 13a and 13b. The core 13 is pivotally mounted on a pivot 14 and adapted to rock on the substantially horizontal axis of said pivot. Said pivot is shown as journaled in plates or members 15 at either side of core 13 as illustrated in Fig. 1. An arm 13c extends to one side of the core 13, pivotally connected at its outer end to a link 16 which can extend to any mechanism or member adapted to be moved to move the core 13. Stop members 17 are disposed below core 13 at either side of pivot 14 to limit the swinging movement of said core. An electric conductor 18 has coils 18a and 18b wound respectively about arms 13b and 13a and extending about said arms in opposite directions. The conductor 18 forms a closed circuit and has in series therewith a condenser 19.

Figure 2:
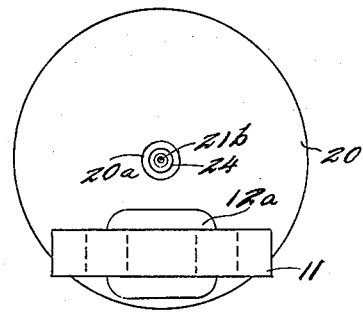
Fig. 2 is a horizontal section taken on line 2—2 of Fig. 1, as indicated by the arrows.

A movable member 20 is provided, illustrated as a disk disposed between the core pieces 11 and 13. Disk 20 is shown as having a central hub 20a through which passes a shaft 21 on which said disk is secured, said shaft being shown as having reduced portions 21a and 21b forming bearings journaled in the members 22 and 23 as shown in Fig. 1. Shaft 21 is illustrated as having secured thereto a small gear or pinion 24 which may mesh with another gear and drive any mechanism or apparatus which is to be driven by said motor. As shown in Fig. 2, it will be seen that the axis of shaft 21 is disposed in the central vertical plane passing through core 11 and through the core 13 when the latter is in the position shown in Fig. 3. The disk 20 is free to revolve in its bearings 22 and 23. The reactance of condenser 19 is made substantially the same as the reactance of the coils 18a and 18b or of the circuit formed by conductor 18, except the condenser.

Figure 3:
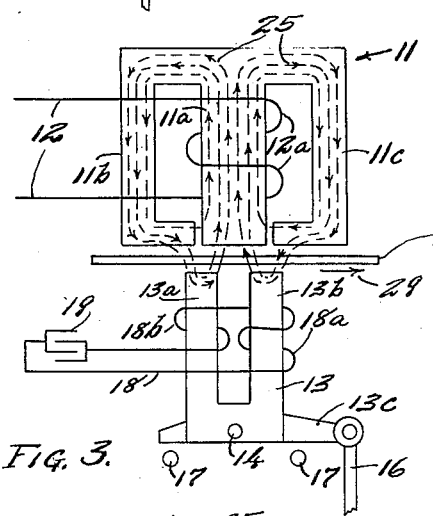
Fig. 3 is a view in side elevation taken at right angles to Fig. 1.
Figure 4:
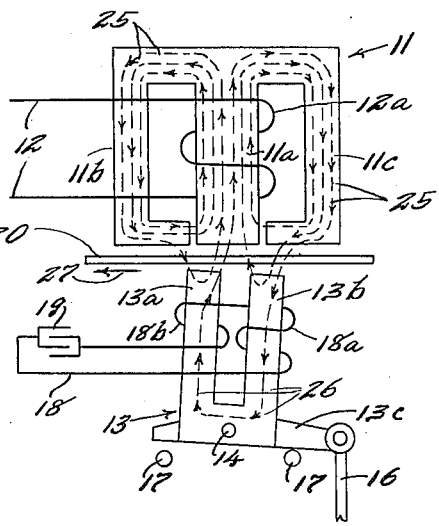
Fig. 4 is a view similar to Fig. 3, showing the parts in a different position.
Figure 5:
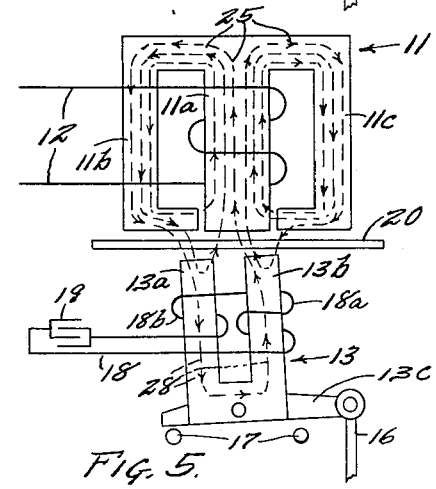
Fig. 5 is a view similar to Fig. 3, showing the parts in still another position.

In operation, when alternating current is supplied to conductor 12, a magnetic flux is set up in the core 11. The flow of flux in said core is indicated in Figs. 3, 4 and 5 by the dotted lines and arrows 25. With core 13 in the position shown in Fig. 3, the same is centrally or symmetrically disposed in relation to the core 11. As shown, the magnetic flux is flowing upward from the center post 11a through the coil 12a and returning downward in the outer arms 11b and 11c, the same crossing the air gaps between said arms and returning to center post 11a. Part of the leakage flux flowing from the outer arms 11b and 11c passes downwardly through the disk 20 and through the upper faces of the arms 13a and 13b of the core 13, and this flux also returns to the center post 11a. With the core 13 in the position shown in Fig. 3, the reluctance of the path from the post 11a to arm 13a and the path from post 11a to the arm 13b are equal and the reluctances of the path from the post 11b to arm 13a and the path from post or arm 11c to the arm 13b are equal. Therefore no flux emanating from core 11 passes through the core 13. All of the flux passing through the disk 20 therefore is in phase with the flux of core 11 or the flux passing through the coil 12a and no torque is developed in the disk 20.

If, however, the core 13 be moved to the right as shown in Fig. 4, the reluctance of the path from post 11a to arm 13a is less than the reluctance of the path from post 11a to arm 13b, and the reluctance of the path from post or arm 11c to arm 13b is less than the reluctance of the path from post or arm 11b to arm 13a. Therefore, part of the leakage flux from core 11 passes down through the core 13 as indicated by the dotted lines and arrows 26 in Fig. 4. This leakage flux passing through core 13 passes through the coils 18a and 18b and induces a current in conductor 18 and through the condenser 19. As the inductive reactance of the coils 18a and 18b is offset by the condensive reactance of the condenser 19, leaving only the resistance of the circuit effective, the current induced in this circuit lags at quadrature to the flux which induced it. The current in coils 18a and 18b thereupon sets up a magnetic flux in the core 13 which passes through the disk 20 at quadrature with the flux emanating from core 11, thereby producing a shifting magnetic field between core 11 and core 13 and causing the disk 20 to be driven in the direction of the arrow 27.

In Fig. 5 the core 13 is shown as moved to the left from its central position, and in accordance with the above explanation, the leakage flux will thus pass through the core 13 in the path shown by the dotted line and arrows 28. This flux passes through the coils 18a and 18b and a current is induced in the conductor 18 and in the circuit thereof passing through the condenser 19. As above stated, the reactance of the condenser is substantially the same in value but of opposite sign as that of the coils 18a and 18b and the only effective impedance, therefore, in the circuit of the conductor 18, is the ohmic resistance. For this reason, quite a large current is induced in the conductor 18 by the flux in the core 13. The instantaneous direction of the current in conductor 18 with the parts in position shown in Fig. 5, is opposite to the direction of that in conductor 18 with the parts in the position shown in Fig. 4. The flux set up in core 13 therefore in Fig. 5 by the current in conductor 18 is reversed, and the direction of torque on disk 20 by the shifting magnetic field is reversed and disk 20 is driven in the direction shown by arrow 29.

It is thus seen that two magnetic circuits are provided, one traversing the upper core 11 and the other traversing the lower core 13. The core 13 can be moved with a very small amount of energy and this varies the coupling between the two magnetic circuits. This small amount of energy varies or reverses the instantaneous flow of magnetic flux in the core 13 and controls the movement of the disk 20 and the amplified amount of energy driven through the pinion 24. With one embodiment, in practice a movement of one one-thousandth of an inch of core 13 causes a rotation of the disk 20. The closed circuit consisting of conductor 18 and condenser 19, of course, has inductance, resistance and capacity.

Figures 6, 7:
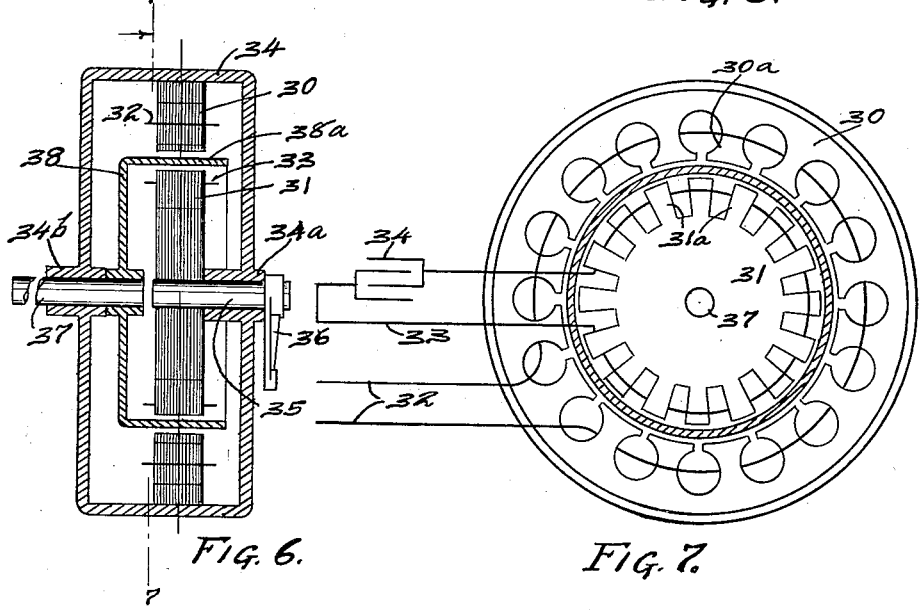
Fig. 6 is a vertical section showing a modification.
Fig. 7 is a vertical section taken on line 7—7 of Fig. 6, as indicated by the arrow.

In Figs. 6 and 7 a modified form of the invention is shown, in which in place of the cores 11 and 13 an outer core or stator 30 is shown and an inner core or stator 31 is shown. The outer stator 30 has projecting arms or teeth 30a and these will be wound by conductor 32. As illustrated in Fig. 7, adjacent arms are oppositely wound. The inner stator also has arms or teeth 31a wound by a conductor 33 forming a closed circuit and having in series therewith a condenser 34. As indicated in Fig. 7 adjacent arms 31a are oppositely wound. The stator 30 in Fig. 6 is illustrated as carried by the frame 34 having spaced central hubs or bearings 34a and 34b in bearing 34a of which is journaled a shaft 35 to which the inner stator 31 is secured. Shaft 35 has secured thereto an arm 36 by means of which said shaft and the inner stator 31 may be rotated or oscillated. The bearing 34b has secured thereto a shaft 37, to which is secured a cup-shaped member 38 having a cylindrical disk portion 38a disposed between stators 30 and 31. As in the form shown in Figs. 1 to 5, the condenser 34 will have substantially reactance of the same value but of opposite sign as the coils on the arms 31a.

In operation when alternating current is supplied to conductor 32, a magnetic flux is caused to pass through the stator 30 and through the arms 30a. With the parts shown as positioned in Fig. 7 with each one of the teeth 31a directly opposite a space between two arms 30a, any leakage flux which may pass through the cylindrical portion 38a from stator 30 to the teeth 31 will be in phase with the flux in stator 30. There is thus no tendency to rotate member 38. If, however, the inner stator 31 be rotated somewhat so that the teeth 31 are not opposite the space between arms 30a, the flux from stator 30 will pass into the teeth 31a and a magnetic flow of flux will be established in the inner stator 31. This flux will induce a current in conductor 33. This current in turn sets up a magnetic flux in stator 31 which is at quadrature to the flux in outer stator 30 and a shifting magnetic field is produced causing rotation of the member 38. If inner stator 31 is moved in a clockwise direction as shown in Fig. 7 from the position shown therein, member 38 will be caused to rotate in the opposite direction from that when inner stator 31 is rotated somewhat to the left or in a counter clockwise direction from the position shown in Fig. 7. It will thus be seen that by moving the stator 31 in either direction, member 38 is caused to rotate respectively in either direction and power can be taken from shaft 37 to drive the desired apparatus.

Figure 8:
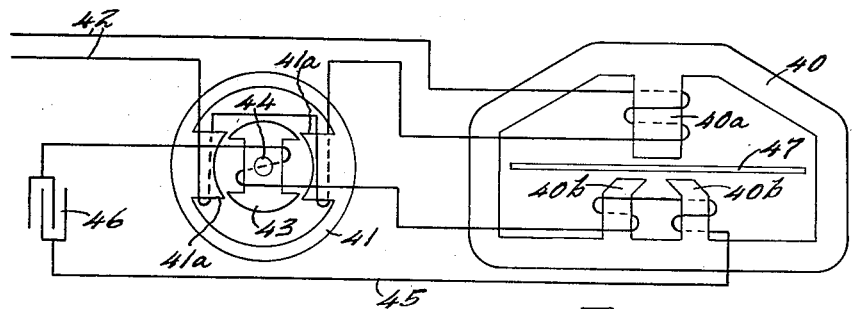
Fig. 8 is a view in side elevation of a modified form of the motor.

In Fig. 8 another modification is shown, in which a field frame 40 is provided, illustrated as of flat hexagonal form with parallel or horizontal top and bottom. The arm or pole piece 40a projects downwardly centrally of said frame and spaced pole pieces 40b extend upwardly from the bottom of said frame, pole pieces 40b being disposed at equal distances from the central vertical axis of said frame. A second core or field frame 41 is provided, illustrated as of circular or cylindrical form and the same has projecting inwardly therefrom opposite poles 41a. A conductor 42 is wound about the arm or pole piece 40a and then extends to and is wound successively about the poles 41a, this conductor being adapted to be connected to a source of alternating current. An oscillating member or armature 43 is mounted on a shaft 44 having end parts with surfaces concentric with the core or frame 41 and the curved ends of the poles 41a. A conductor 45 is provided, which is wound in opposite directions respectively about the poles 40b and is also wound about the central portion of armature 43, said conductor forming a closed circuit and having in series therewith a condenser 46. A movable or a rotatable disk 47 is disposed between arms or poles 40a and 40b and adapted to rotate on a central axis disposed in the vertical plane passing centrally through pole 40a and between poles 40b at right angles to the plane of Fig. 8. The reactance of condenser 46 is arranged to be substantially the same in value but of opposite sign to the reactance of the remainder of the circuit formed by conductor 45 or of the coils disposed about poles 40b and armature 43.

In operation with the parts shown in the position illustrated in Fig. 8, when alternating current is supplied to conductor 42, a magnetic flux will be set up in core 40 and pole 40a. A magnetic flux will also be set up in the core 41 and poles 41a but with the armature 43 in the position shown in Fig. 8 the flux passing between poles 41a will have no inductive effect on the conductor 45. Any flux passing through poles 40b will be equally divided between the two poles 40b and as the conductor 45 is wound in opposite directions around each one of the poles 40b no current will be induced to flow in the conductor 45 and the flux in poles 40b will be in phase with the flux in pole 40a and will therefore have no rotative effect on the disk 47. If, however, armature 43 be rotated in a clockwise direction, the flux set up between the poles 41a will pass through the armature 43, along the axis of the coil formed by the conductor 45 being wound around the armature 43. This will induce a current in conductor 45 and the circuit formed thereby which will lag ninety degrees behind the flux and a magnetic flux will be in turn set up in arms or poles 40b which will be out of phase with the flow of flux in pole 40a. A shifting magnetic field will be produced, causing rotation of disk 47. If armature 43 be rotated in a counter direction, a similar action will take place and the disk 47 will be rotated in the opposite direction.

Figure 9:
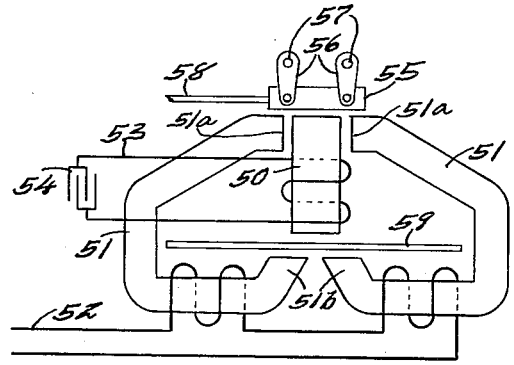
Fig. 9 is a view in side elevation of a still further modified form of motor.

In the modification shown in Fig. 9, a core 50 is provided and cores 51 are disposed at either side thereof, being illustrated as substantially of trapezoidal form with one open side. As shown, cores 51 have vertical surfaces 51a spaced slightly from the vertical sides of the pole 50 adjacent its upper end, and cores 51 also have upwardly and inwardly directed poles 51b spaced somewhat below the bottom of core 50 and at equal distances at either side of the central axis thereof. A conductor 52 is provided, wound in the same direction about core 51 or the poles 51b thereof to which alternating current will be supplied. Another conductor 53 is wound about the central core 50 and forms a closed circuit having in series therein a condenser 54. A magnetic member 55 is disposed above the top of the core 50 and the upper portions of cores 51 suspended by links 56 pivoted thereto and in turn suspended on pivot members 57. A rod 58 is secured to member 55 by which it can be moved to the right or left as shown in Fig. 9. A movable member such as a rotatable disk 59 is provided, disposed between the bottom of the core 50 and the pole members 51b having its axis disposed in a vertical plane extending centrally of members 50, 55 and 51 and at right angles to the plane of Fig. 9. The reactance of the condenser 54 will be adjusted to be substantially of equal value but of opposite sign to that of the coil about core 50.

When alternating current is supplied to conductor 52 a magnetic flux will be set up in the two cores 51; between poles 51a through the upper end of core 50 and through the magnetic member 55; and also between the lower poles 51b with some of the flux passing through the disk 59 and through lower end of core 50. As the conductor 52 is wound about the core members 51 so as to set up opposite polarity in the two poles 51b and since the reluctances of the paths from poles 51b to core 50 and from the upper end of cores 51 to core 50 are equal, and since the magnetic member 55 is here considered as being in a central position and therefore does not disturb the equality of the reluctance between the poles 51a and the core 50, there will be no flow of flux through core 50 and through the coil of conductor 53. If, however, member 55 be moved to the right, the reluctances of the paths between the poles 51a and the core 50 will be unbalanced and a flow of magnetic flux will take place through core 50 and the coil of conductor 53. This flow of flux in member 50 will induce a current in conductor 53. This current in turn sets up a flow of flux in core 50 which is out of phase with the flux set up in poles 51b. A shifting magnetic field is therefore produced between the lower ends of core 50 and poles 51b and the rotation of disk 59 is caused. If member 55 is moved to the left, the flow of magnetic flux will be caused to pass through the core 50 in the opposite instantaneous direction to what it was with the member 55 moved to the right. The instantaneous direction of the current in the conductor 53 will also be reversed, and disk 59 will be rotated in the opposite direction to that when member 55 was moved to the right.

From the above description it is seen that applicant has provided a simple and efficient form of reversible motor and one that can be controlled or reversed by an exceedingly small movement of a member requiring a very small amount of energy for its movement. The motor is particularly adapted to be made in small sizes for operating various control members where it is desired to move some apparatus by the small movement of a regulating member. It will readily be seen that member 16 in Figs. 1 to 5 or the movable control members in the modification shown in the other figures could be readily moved by a diaphragm, thermostat or similar member having small power of movement. The motor in turn could control an apparatus requiring considerable power for its operation. The motor is particularly adapted for very fine and accurate regulation. The same can be compactly built and can be built at small expense. At the same time it is very substantial and durable. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. An electric motor having in combination, a magnetic circuit, means for causing a flow of flux in said magnetic circuit, a core for a second magnetic circuit disposed adjacent to and in neutral relation to said first mentioned magnetic circuit so that no flux from said first mentioned circuit passes therethrough, an electric circuit interlinked with said core and having inductance, a device having capacity in series with said electric circuit, a movable member between said magnetic circuits, and means for changing the relative position of first mentioned magnetic circuit and said core to set up a flow of flux in said core and induce a current in said electrical circuit and cause a shifting field to move said movable member.

2. An electric motor having in combination, a magnetic core, an electric conductor wound on said magnetic core, means for producing an alternating magnetic flux in said magnetic core, a second magnetic core having arms positioned symmetrically with relation to said first mentioned magnetic core, a second electric conductor forming a closed circuit having coils wound on said second magnetic core, means in series with said second electric conductor having a reactance substantially equal in value and of opposite sign to the reactance of said coils, means for moving said second magnetic core to either side of its symmetrical position with relation to said first mentioned magnetic core to cause a flow of flux in said second magnetic core, and a movable member between said magnetic cores adapted to be moved in opposite directions by a shifting magnetic field produced when said second magnetic core is moved respectively to one side or the other.

3. An electric motor having in combination, a magnetic core, an alternating electric circuit producing a magnetic flux in said magnetic core, a second magnetic core having spaced portions arranged symmetrically with said first mentioned magnetic core, coils comprising a closed electric circuit wound on said second magnetic core, a device in series with said closed electric circuit having a reactance substantially equal in value to and of opposite sign to the reactance of said coils, a movable member between said magnetic cores, and means for relatively moving said magnetic cores to vary the path of flux through said second magnetic core, whereby a shifting magnetic field is produced causing movement of said movable member.

4. An electric motor having in combination, a magnetic circuit, an alternating electric circuit interlinked with and producing a magnetic flux in said magnetic circuit, a second magnetic circuit being coupled with the first mentioned magnetic circuit, a closed electric circuit interlinked with said second magnetic circuit, a device in series with said closed circuit having a reactance substantially equal in value to and of opposite sign to the reactance of the remainder of said closed circuit, means for changing the direction and magnitude of said coupling, and a movable member disposed in the flux passing between said magnetic circuits.

5. An electric motor having in combination, a pole piece, an electric circuit of alternating current inductively related to and producing a magnetic flux in said pole piece, a second pole piece arranged symmetrically with said first mentioned pole piece, a closed electric circuit interlinked with said second pole piece, means for moving said second pole piece to one side or the other of said symmetrical position to cause a flow of flux therethrough from said first mentioned pole piece, a device in series with said closed electric circuit having a condensive reactance and a movable member between said pole pieces and acted upon by a shifting magnetic field set up by the interaction of the said magnetic flux with the magnetic flux resulting from the induced current in the closed electric circuit.

6. An electric motor having in combination, a pole piece, an electric circuit of alternating current inductively related to and producing a magnetic flux in said pole piece, a second pole piece arranged symmetrically with said first mentioned pole piece, a closed electric circuit carried by said second pole piece, the said closed electric circuit having capacity and inductance in series, a movable member disposed between said pole pieces, and means for causing a magnetic flux in said second pole piece out of phase with the magnetic flux in said first mentioned pole piece to produce a shifting magnetic field for moving said movable member.

7. An electric motor having in combination, a pole piece, an electric circuit of alternating current inductively related to and producing a magnetic flux in said pole piece, a second pole piece arranged symmetrically with said first mentioned pole piece and with the magnetic field thereof, a closed electric circuit carried by said second pole piece and having a coil wound on said second pole piece, a condenser in series with said closed electric circuit, and means for relatively moving said pole pieces so that the reluctance of the path from said first pole piece into said second pole piece is varied to cause a flow of flux in said second pole piece and a movable member between said pole pieces acted upon by a shifting magnetic field caused by a magnetic flux set up in said second pole piece by the current induced in said closed circuit.

8. An electric motor having in combination, a non-rotatable pole piece, an electric circuit of alternating current inductively related to and producing a magnetic flux in said pole piece, a second non-rotatable pole piece arranged symmetrically with relation to said first mentioned pole piece and with the magnetic field thereof, said second pole piece being mounted on a pivot so as to be movable to one side or the other of symmetrical position, a conductor forming a closed electric circuit having a coil wound on said second pole piece and having a condenser in series therewith, means for oscillating said second pole piece, and a movable member disposed between said pole pieces and acted upon by a shifting magnetic field.

9. In an electric motor, a magnetic circuit, means for setting up a magnetic flux in said magnetic circuit, a second magnetic circuit, a variable and reversible coupling between said first circuit and said second circuit, a closed electric circuit interlinked with said second magnetic circuit, said electric circuit having resistance, inductance and capacity in series therein, and a movable member interposed in the magnetic flux traversing the first magnetic circuit and the magnetic flux traversing said second magnetic circuit.

10. An electric motor having in combination, a magnetic circuit, a second magnetic circuit, a variable and reversible coupling between said circuits, an electric circuit interlinked with said second magnetic circuit, said electric circuit having resistance and inductance, and a device in said electric circuit having a reactance substantially equal in value and of opposite sign to the reactance of the remainder of said electric circuit, and a movable member positioned between said magnetic circuits and traversed by the flux thereof.

11. An electric motor having in combination, a magnetic member, means for setting up a magnetic flux in said member, a second magnetic member disposed adjacent said first mentioned member and movable to positions relatively thereto, where the magnetic flux of said first mentioned member will not pass therethrough, will pass therethrough in one direction, and will pass therethrough in the opposite direction, an electric circuit including a winding on said second member, and a condenser in series therein having a reactance substantially equal in value to and of opposite sign to the reactance of the balance of said electric circuit, and a movable member interposed between said members and moved by a shifting magnetic field produced by said first mentioned magnetic flux, and a magnetic flux in said second member out of phase with said first mentioned magnetic flux and caused by the current in said electric circuit induced by the first mentioned magnetic circuit when said second member is in one of said two latter positions.

CARL J. GARDEEN.